United States Patent [19]
Wilson

[11] Patent Number: 5,149,164
[45] Date of Patent: Sep. 22, 1992

[54] BED FINISHER FOR PICKUP TRUCK

[76] Inventor: Jesse E. Wilson, 13207 Dairy Maid Dr. #204, Germantown, Md. 20874

[21] Appl. No.: 757,216

[22] Filed: Sep. 10, 1991

[51] Int. Cl.$^5$ .............................................. B62D 25/00
[52] U.S. Cl. ...................................... 296/50; 296/57.1
[58] Field of Search .............................. 296/50, 51–55, 296/57.1-62

[56] References Cited

U.S. PATENT DOCUMENTS

| | | | |
|---|---|---|---|
| 1,445,571 | 2/1923 | Ullom | 296/50 |
| 1,637,631 | 8/1927 | Beintema | 296/57.1 |
| 1,807,084 | 5/1931 | Chevrier | 296/30 |
| 2,649,308 | 8/1953 | Bice, Jr. | 296/57.1 |
| 4,743,058 | 5/1988 | Fedrigo | 296/57.1 X |
| 4,750,777 | 6/1988 | Brammer | 296/50 |
| 4,763,944 | 8/1988 | Fry et al. | 296/50 |
| 4,867,499 | 9/1989 | Stephan et al. | 296/50 |
| 4,930,834 | 6/1990 | Moore | 296/50 |
| 4,932,705 | 6/1990 | Miller | 296/50 |

OTHER PUBLICATIONS

Selection from a 1991 Mail-Order Catalog for "Jeg's High Performance".
Four Wheeler Magazine, pp. 34–36, Sep. 1991.
Sear Roebuck and Company Catalog, pages not numbered, Fall/Winter 1991.

Primary Examiner—Robert R. Song
Attorney, Agent, or Firm—Michael de Angeli

[57] ABSTRACT

An improved bed finisher for being received in lieu of the tailgate of a conventional pickup truck is disclosed. The bed finisher comprises left and right uprights and a transverse member. The uprights mate with the standard tailgate mounting hardware of the pickup truck and conceal the hardware so as to provide an attractive and stylish appearance to the rear of the truck when the tailgate is removed. A cargo net or the like may be provided extending between the left and right uprights, allowing the assembly of the bed finisher and cargo net to be removed and replaced by the conventional tailgate very conveniently. The left and right upright members may each include a frame intended for mating with the tailgate mounting hardware of one or more standard trucks, and a cover member intended to mate identically with each of the various types of frame.

20 Claims, 2 Drawing Sheets

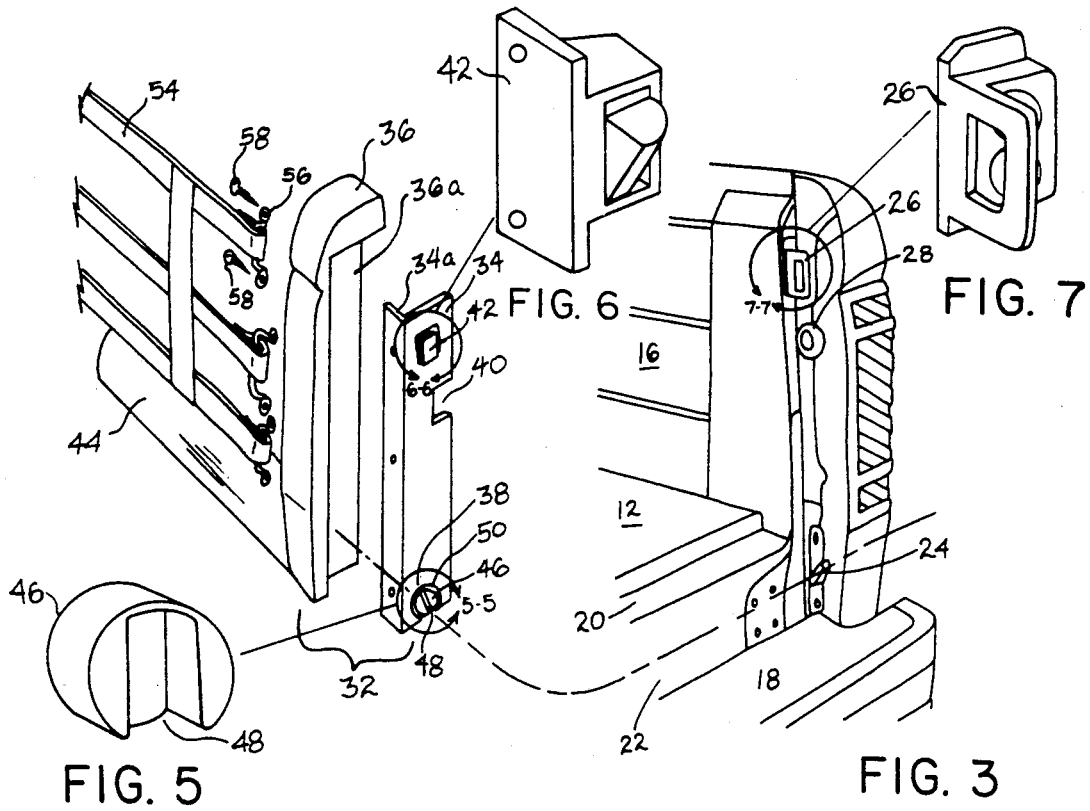
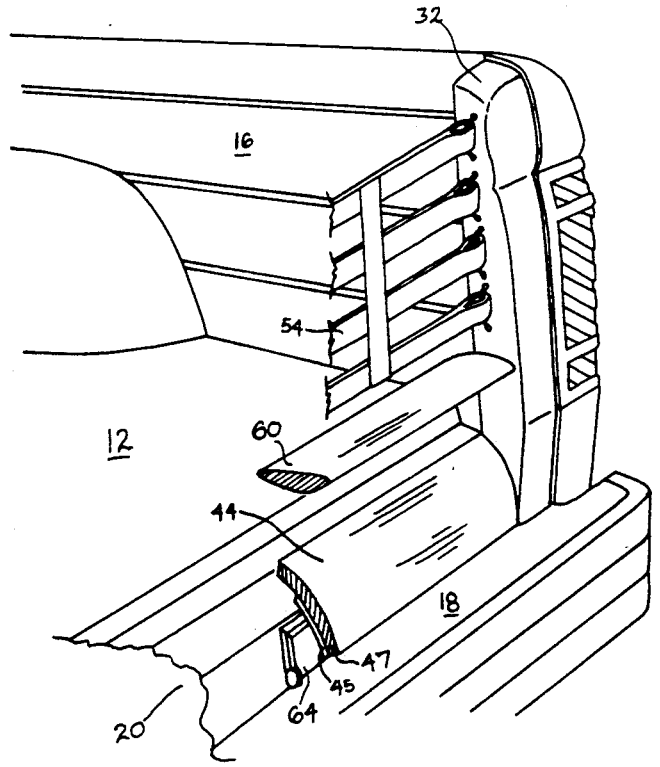

BED FINISHER FOR PICKUP TRUCK

BACKGROUND OF THE INVENTION

1. Field of the Invention

This invention relates to a bed finisher for a pickup truck. More particularly, this invention relates to a generally U-shaped frame member for fitting into the cargo bed of a pickup truck or the like in the same manner as the tailgate normally supplied with the truck.

2. Discussion of the Prior Art

Modern pickup trucks and similar vehicles are typically sold with rigid metal tailgates pivoted on fixed pivot members at lower lateral edges of the side walls of the cargo bed of the truck body. Lateral catches on either side of the tailgate mate with latch members mounted to the side walls of the cargo bed, to maintain the tailgate in the closed and locked position. Commonly such tailgates are made so that when the catches have been released, the tailgate can simply be lifted off the pivot members mounted in the side walls of the cargo bed, removing the tailgate completely. In some cases the owner is also obliged to release one or more flexible cables or chains, one end of each fixed to the tailgate and the other to a stanchion on the side wall of the cargo bed, holding the tailgate in the horizontal position when open.

In other trucks, the pivot between the tailgate and the bed of the truck is provided by hinges at the lower edge of the tailgate, rather than at its ends. In such cases, the hinge pin must be removed, or the hinge disassembled from either the tailgate or the cargo bed, to remove the tailgate.

When the tailgate is released and removed from the cargo bed of the truck, the tailgate mounting "hardware" (that is, the pivot member, the latch, and the stanchion) normally mating with the tailgate on either side of the cargo bed is left exposed. This hardware is normally not attractive to the eye. Commonly the rearmost portion of the cargo bed includes a transverse wall structure extending between the floor of the cargo bed and the truck's rear bumper, to mate with the lower edge of the tailgate. This wall structure is normally not well finished, including rivet heads and the like, and is not cosmetically attractive.

Owners of pickup trucks frequently replace the tailgates with flexible perforated cargo nets. Such nets provide substantial cargo retention, particularly for bulky objects, while improving the aerodynamics of the truck, in that air which would otherwise collect against the inner wall of the tailgate causing wind resistance is permitted to exhaust through the holes in the mesh net. Normally such nets are mounted to the side walls of the cargo bed of the pickup (and in some cases also to its floor, or to the truck bumper) by cleats affixed to the cargo bed with sheet metal screws or the like. The owner of the truck must normally drill holes for the screws upon initial installation, and must individually drive (or remove) each screw when it is desired to mount (or remove) the cleats. Alternatively the net may be fitted with buckles or snaps for disengaging the net from the cleats. Either procedure is relatively time consuming, to the extent that it is impractical to repetitively remove the tailgate and replace it with a net. This tends to minimize use of such nets. Moreover the drilling of numerous holes in the cargo bed to mount the cleats can lead to corrosion and unsightly damage to the finish of the truck. Cleats for mounting nets can also be affixed to the side walls of the cargo bed by welding. To do so is even less favored, as welding destroys the finish of the cargo bed. The cleats must also be placed so as to avoid interference with the normal operation of the tailgate.

Covers to conceal the cleats have also been offered. These must also be attached to the cargo bed of the truck by screws threaded into holes drilled in the truck body. Use of such covers further exacerbates the corrosion problem noted, and renders mounting and removal of the cargo net more complex.

There are also sold replacement rigid tailgates for pickup trucks made of rigid metallic wire mesh or expanded metal screen welded to a frame to form a continuous panel while allowing air passage. These so-called "air gates" are designed to provide a rigid cargo retaining structure while reducing air resistance. However these air gates are not attractive, and are heavy and rather costly.

Prior to the present invention there has not been provided a bed finisher for concealing the unsightly hardware normally employed to mount the tailgate to the cargo bed of a truck, that enables ready attachment of a flexible net or the like, that may be readily mounted or removed, and that can be manufactured at reasonable cost while providing satisfactory appearance and function.

OBJECTS AND SUMMARY OF THE INVENTION

It is therefore an object of the invention to provide a bed finisher for placement in the cargo bed of a truck in lieu of a tailgate, that mates with and attractively conceals the standard hardware used to mount the tailgate to the truck, that enables ready attachment of a rigid or flexible cargo net, and that can be manufactured readily and inexpensively of a number of different external materials all at reasonable cost.

It is a further object of the invention to provide a bed finisher comprising first and second vertical members mating with the cargo bed of a truck in the same manner as the tailgate supplied with the truck, that may further comprise a rigid transverse member, and that comprises means for readily attaching a flexible net or the like.

In a typical embodiment, the bed finisher according to the present invention comprises left and right upright members, each including means for mating with the pivot members allowing pivoting of the standard tailgate of a pickup truck, and means for mating with the latch assemblies also mounted on the side walls of the truck bed assembly. The left and right upright members may be joined by a transverse member concealing the wall structure between the floor of the cargo bed and the bumper of the truck for mating with the lower edge of the tailgate. The transverse member may carry a pivot member for mating with the tailgate pivot member, where this pivot is provided at the lower transverse edge of the tailgate.

The left and right upright members comprise attachment points for readily affixing conventional flexible cargo nets thereto, so that the assembly of the left and right members, the transverse member if used, and the net can be removed and replaced together in a ready and convenient fashion without welding cleats to the cargo bed, or drilling additional holes in the cargo bed of the truck. The assembly may also comprise a transverse airfoil member mounted above the bed of the truck.

In a preferred embodiment the left and right upright members each comprise a frame and an external cover member. A number of different frames are manufactured to mate with the pivots and catches of a wide variety of conventional truck cargo beds, while each of the frames comprises mounting structure for receiving a cosmetically attractive cover member in the same way. In this way a manufacturer of bed finishers according to the invention need provide only as many different frames as necessary to mate with the trucks of interest, while all of the cover members fit the frames identically so that only one type of cover member need be manufactured in a given style. The cover members may be made of structural or nonstructural materials including plastic, wood, metal and fiberglass. They may be manufactured in a variety of colors. The transverse member(s) may be made of or covered in the same materials as the cover members, so as to provide an attractive finished look to the truck. In each case the cover members conceal the frames and the tailgate mounting hardware beneath them, providing a finished and stylish appearance to the tailgate of the cargo bed of the truck. A cargo net or similar structure may then conveniently be attached to the left and right vertical members, and to the transverse member if used, and may be removed either together with or separately from the bed finisher according to the invention.

Other objects and advantages of the present invention will become apparent from the following description of the preferred embodiment taken in conjunction with the accompanying drawings wherein like parts in each of the several figures are identified by the same reference characters.

BRIEF DESCRIPTION OF THE DRAWINGS

FIG. 3 is an exploded perspective view of a preferred embodiment of the bed finisher of the invention, illustrating the manner of its assembly to the cargo bed of a pickup truck;

FIG. 4 shows a three quarter perspective view, partly in section and partly cut away, of the right rear corner of the cargo bed of the pickup truck of FIG. 1, illustrating one alternative combination including the bed finisher of the invention, and illustrating an alternative embodiment of the means of pivoting the bed finisher of the invention with respect to the cargo bed of the truck;

FIG. 5 is an enlarged view of pivot element 46, as indicated at 5—5 of FIG. 3;

FIG. 6 is an enlarged view of spring catch 42, as indicated at 6—6 of FIG. 3; and FIG. 7 is an enlarged view of latch member 26, as indicated at 7—7 of FIG. 3.

DESCRIPTION OF THE PREFERRED EMBODIMENTS

Figure 1:
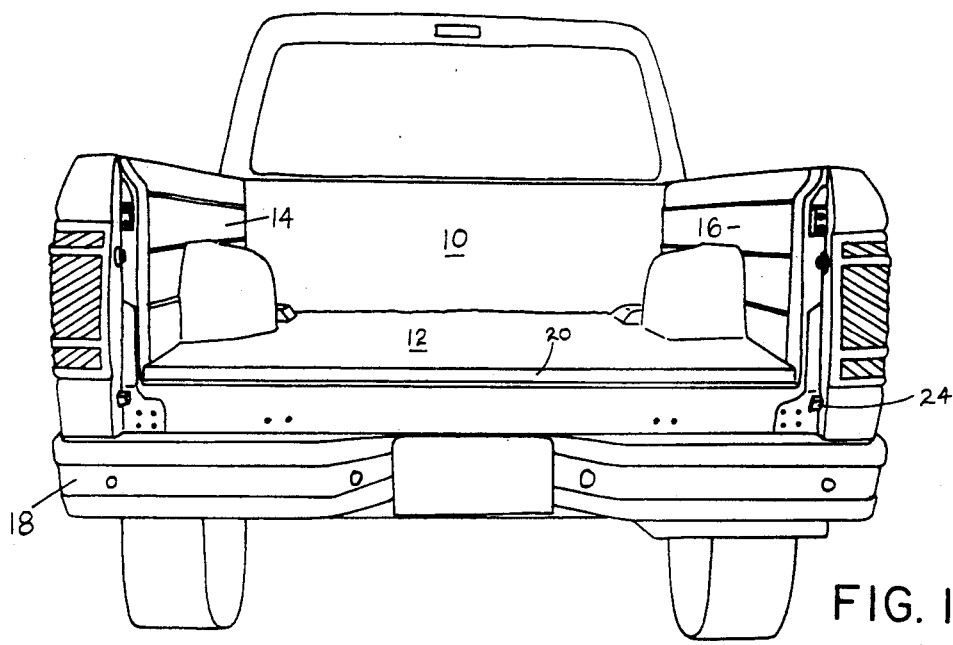
FIG. 1 is a perspective view of a conventional pickup truck, from the rear, with the tailgate removed.
Figure 2:
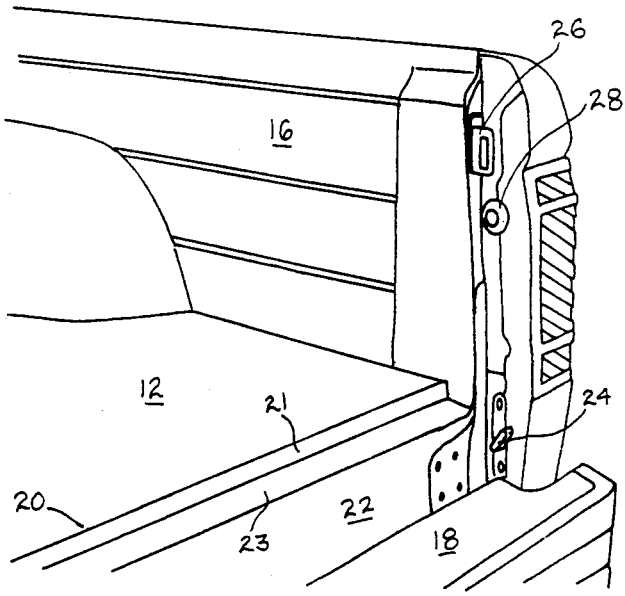
FIG. 2 is a three quarter perspective view of the right rear corner of the cargo bed of the pickup truck of FIG. 1.

As indicated, FIG. 1 is a perspective rear view of a pickup truck having had its tailgate removed, while FIG. 2 shows an enlarged three-quarter perspective view of the right rear corner of the pickup truck, showing the hardware attaching the tailgate to the cargo bed of the pickup in more detail. The cargo bed 10 of the pickup comprises a floor 12 and left and right side walls 14 and 16. The floor 12 of the truck meets its rear bumper 18 at a transverse wall structure 20, typically including one or more substantially vertical walls 21 and 22 and a horizontal surface 23.

In most cases, the left and right ends of the tailgate contain pivot members which mate with pivot supports 24 fixed to the side walls of the cargo bed 10 of the truck (in an alternative discussed below, the tailgate is hinged to the transverse wall structure 20 of the truck, or the equivalent). The upper portions of the lateral ends of the tailgate of the truck typically comprise releasable spring-loaded catches mating with latch members 26 also fixed to the walls of the cargo bed. Typically each side wall 16 of the cargo bed includes a stanchion 28 for receiving a loop of a cable or chain, the other end of which is attached to the tailgate to hold the tailgate in the horizontal position when released from latches 26.

As shown in FIG. 2, the tailgate mounting hardware, including the pivot supports 24, the latch members 26 and the stanchion 28, together with the transverse wall structure 20, as exposed upon removal of the tailgate, is not particularly attractive. According to the invention there is provided a bed finisher which fits into the truck in the manner of the tailgate when the tailgate is removed, requiring no additional mounting structures or drilling or welding operations. The bed finisher of the invention mates with appropriate portions of the tailgate mounting hardware, both to conceal the hardware and to provide an efficient method of assembly. In a preferred embodiment, the bed finisher of the invention further conceals the transverse wall structure 20, as well as any gap between the cargo bed 10 and bumper 18, and provides an attractive, stylish and finished look to the truck. Moreover the bed finisher of the invention provides a convenient means for mounting other desired accessories, such as a cargo net.

FIG. 3 shows the right upright member 32 of the bed finisher according to the invention, and the corresponding corner of the cargo bed of the truck. The left upright member (not shown) is essentially constructionally and functionally identical, but includes any variation needed to accommodate the hardware on the left side wall of the cargo bed. In the preferred embodiment the upright 32 comprises an inner frame member 34 and an outer cover member 36, but the invention is not so limited; the functions of the inner frame member 34 and outer cover member 36 can be provided by an integral member in certain embodiments of the invention. The frame member 34 comprises a pivot means 38 for mating with the pivot support 24 in the end of the side wall 16 of the pickup truck. A cut-out 40 is formed in the frame 34 to avoid interference with the stanchion 28. A catch 42 (See FIG. 6) is provided for releasably mating with the latch member 26 (See FIG. 7), to releasably affix the upright member 32 to the side wall 16 of the pickup truck.

A complete assembly of the bed finisher according to the invention typically also includes a transverse lateral member 44 shaped on its proximal surface to conform to transverse wall structure 20, and shaped to provide a smooth, preferably continuously curved external surface extending from the distal end of the planar bottom surface 12 of the cargo bed down to the bumper 18 of the pickup, thus concealing the wall structure 20, as well as any gap between the cargo bed and the bumper, and providing a smooth and finished appearance. Typically the transverse member 44 will be rigidly attached to the end members 3 to provide rigidity to the structure, ensuring that the pivot means 3B does not escape from the pivot support 24, and so that the bed finisher assembly can be removed from the cargo bed as a unit, simply by detaching the catches 42 from the latch members 26, pivoting the assembly about the pivot means 38 and lifting it off the pivot supports 24, as the standard tailgate is removed from the truck.

As shown in FIG. 3 and as described briefly above, the left and right upright members 32 preferably comprise an inner frame 34 and an outer cover member 36. In ordinary use, that is, when the bed finisher of the invention is assembled to a pickup truck, i.e. in the "tailgate closed" position (shown in FIG. 4) the frame 34 is not seen but is fully concealed by the cover member 36. There are several reasons for so doing. As noted above, one of the objects of the invention is to provide a stylish and attractive appearance to the cargo bed of the vehicle. The cover member 36 may be formed of any of a wide variety of materials and any one of a wide variety of colors to accomplish this end, in any manner to suit the taste of the owner of the vehicle. Some owners may prefer for example cover members 36 formed of aluminum anodized to bright reflective surfaces. Others may prefer plastic molded in bright or fluorescent colors. Others may prefer wood painted or finished to show the grain of the wood. Fiberglass may be the most economical material. Any of a wide variety of cover members may be so manufactured.

In some cases, it may be desirable to form the external surface contour of the upright to continue the contour of the side wall of the cargo bed. In these cases, it may not be feasible to employ each cover style with each type of truck. Furthermore, in these cases it may be preferable to provide an integral upright performing the functions of both the frame and the cover.

The provision of the frame 34 as a separate member from the cover 36 allows a manufacturer to make a wide variety of frame members 34 mating appropriately with the hardware for supporting the tailgates of a number of different standard trucks. The cover members 36, however, will typically be manufactured to mate identically with each of the various frames 34. For example, suppose that a manufacturer wished to provide bed finishers according to the invention to owners of ten different brands of truck, each having slightly differing tailgate mounting hardware, so that each of the bed finishers must mate somewhat differently with each of the trucks. Suppose further that the manufacturer wished to sell the visible cover members 34 of the uprights 32 in ten different combinations of materials and colors. If the manufacturer were required to separately manufacture each of the possible combinations, a total of 100 different products would be required, each differing in more or less detail and requiring differing manufacturing techniques.

By providing the frame 34 as the only member which must uniquely fit a single truck or line of trucks, all types of frames 34 mating identically with each of the various cover members 36, only ten frame types and ten cover members need to be made, and only twenty different products need to be produced. Indeed the appropriate combination can be made at the point of sale, further simplifying inventory requirements on both manufacturer and vendor. Again, however, if the external contour of the upright is to continue the contour of the side walls, not all cover members will be suitable for use with all types of trucks.

As shown, the frame member 34 may comprise a simple member of L-shaped cross section, made of aluminum or steel, attached to the cover member 36 by fasteners extending through holes in a flange 34a of the frame member. As noted it is desirable for manufacturing convenience and economy that each of the cover members 36 mate identically with each of the various frames 34 fitting the tailgate mounting hardware of a number of different trucks. The frame 34 fits into a recess 36a in the cover member. The user can reach into the recess 36a to release the catch 42 to remove the bed finisher of the invention from the cargo bed of the truck.

As noted, each of the frame members 34 must be adapted to mate with the tailgate mounting hardware of a given manufacturer's standard pickup truck, or possibly two or three differing models all using the same hardware. For example, in the case of the current midsize Ford pickup trucks, the pivot supports 24 mounted on the truck side walls are rigid stationary finger members fitting within slots in cylindrical pivot members received within circular recesses in the lateral ends of the tailgate. Therefore, according to the invention a similar circular member 46 having a slot 48 formed therein, as detailed in FIG. 5, is received within a cylindrical recess 50 in the frame 34, so that the mounting and removal of the bed finisher including upright member 32 takes place in precisely the same manner as the mounting and removal of the tailgate to the pickup truck.

As indicated above, in many circumstances it is desirable that the upright members 32 be connected by a rigid transverse member 44 so that no additional means need be provided to retain the upright members 32 in secure engagement with the tailgate mounting hardware on the ends of the side wall of the cargo bed. The ends of the transverse members will typically mate identically with the left and right upright members, although the length of the transverse members must vary to accommodate various widths of cargo beds. As shown in FIG. 4, the transverse member 44 may also comprise a frame 45 and a cover member 47. The frame 45 and cover member 47 may be provided to the vendor as stock items, and cut to the appropriate length upon sale, that is, to suit the buyer's specific truck. In this case, standard components would be provided to permanently join the transverse member 44 to the uprights 32. As noted above, the transverse member 44 preferably conceals the wall structure 20 formed at the distal end of the bed 12, as well as any gap between the truck body and bumper 18, and provides a smooth, attractive and stylish surface extending between the end of the bed 12 and the bumper 18 of the truck. Additional rigid members may also extend between the upright members 32; these can include air foil shaped members 60, as shown in FIG. 4, for appearance, or may include other members.

Typically a cargo net 54 can be mounted to the bed finisher of the invention by fixing cleats 56 extending through loops formed at the ends of the transverse straps of the cargo net 54 to the cover member 36 of the upright 32. The cleats 56 are held to the cover 36 by suitable sheet metal screws or like fasteners 58. Recesses may be provided in the uprights to conveniently receive the cleats. Additional cleats may be used to fix vertical straps of the net 54 to the transverse member 44. Alternatively, the cover may include preformed anchors for the net, eliminating separate cleats. According to this aspect of the invention, a cargo net 54 can be permanently assembled to the bed finisher and the entire assembly can be removed from or installed on the bed of a pickup truck in a few moments, enabling the owner to conveniently alternate as desired between a solid tailgate as supplied with the truck, and a much more stylish and wind cheating cargo net 54. This was not conveniently possible using conventionally available cargo nets as noted above. The cargo net 54 can also be combined with a transverse rigid air foil member 60 or the like as discussed above.

FIG. 4 also shows a modification of the invention necessary in connection at least with certain Toyota trucks, wherein the tailgate is hinged to the transverse structure 20 between the bed 12 of the truck and its bumper 18, rather than pivoted on pivots mounted on the side walls of the bed as shown in connection with FIG. 3. In this case, all embodiments of the bed finisher of the invention must comprise a transverse member 44 extending between the left and right uprights 32. Two or more hinge members 64 are fixed to the transverse member 44 and mate with the tailgate mounting hinge, so that the bed finisher of the invention can readily replace the tailgate of the truck. Again the bed finisher of the invention may include a cargo net 54 extending between the left and right uprights 32, a rigid air foil member 60 or the like.

It will be appreciated that the cover members 36 of the left and right uprights 32 and the cove 47 of the transverse member 44 may be formed of any of a wide variety of materials. Wood, light readily formable metals such as aluminum, plastic, and fiberglass all are possibilities. Each of these may be supplied in a wide variety of finishes, or unfinished, to allow the owner of the truck to customize his bed finisher to his own personal tastes. Typically the transverse member 44 will be finished in the same manner as the uprights 32, but the invention is not so limited. Further alternatives include use of plural differing nets, different styles of rigid members extending between the left and right uprights, and various methods for attaching cargo nets and the like to the left and right uprights. For example it might be possible or desirable to attach the cargo net 54 directly to the frame member 34 rather than the cover member 36, for increased strength. Snap or buckle connection of the net to the uprights, to allow ready removal of the net while retaining the bed finisher on the truck, might also be desirable.

Having described preferred and alternative embodiments of a new and improved bed finisher, it is believed that other modifications, variations and changes will be suggested to those skilled in the art in view of the teachings set forth herein. It is therefore to be understood that all such variations, modifications and changes are believed to fall with the scope of the present invention as defined by the appended claims.

What is claimed is:

1. A bed finisher for being received in lieu of a tailgate of a vehicle having a cargo bed, wherein the lateral ends of the tailgate are pivoted on and releasably latchable to vertical side walls of the cargo bed of the vehicle, said bed finisher comprising left and right upright members, each including means for mating with pivot means formed in the side walls of the cargo bed for mating with pivot members on the lateral ends of the tailgate, each including means for mating with latch members on the side walls of the cargo bed for releasably latching the ends of the tailgate to the side walls of the cargo bed of the vehicle, and each including a cover member for concealing said pivot means and said latch members on the side walls of the cargo bed.

2. The bed finisher of claim 1, further comprising a rigid transverse member joining said left and right upright members.

3. The bed finisher of claim 2, wherein the vehicle has a transverse wall structure for mating with the lower edge of the tailgate, and said rigid member fits within and substantially conceals said transverse wall structure of the vehicle when said bed finisher is mounted thereto.

4. The bed finisher of claim 1, wherein each of said left and right upright members comprises a frame member carrying said means for mating with pivot means formed in the side walls of the cargo bed and said means for mating with latch members on the side walls of the cargo bed.

5. The bed finisher of claim 4, wherein said cover members substantially conceal said frame members when said bed finisher is in place in the cargo bed of a vehicle.

6. The bed finisher of claim 5, wherein plural differing types of said frame members are designed specifically to fit the pivot means and latch members on the side walls of the cargo beds of one or more differing types of standard vehicles, and said cover members are designed to be affixed in an identical manner to substantially all of said plural differing types of frame members.

7. The bed finisher of claim 5, wherein said cover members are formed of plastic.

8. The bed finisher of claim 5, wherein said cover members are formed of aluminum.

9. The bed finisher of claim 5, wherein said cover members are formed of wood.

10. The bed finisher of claim 5, wherein said cover members are formed of fiberglass.

11. The bed finisher of claim 1, wherein said left and right upright members further comprise means for attachment of a flexible net across the end of the cargo bed of said vehicle.

12. The bed finisher of claim 11, further comprising a rigid transverse member affixed to said left and right upright members.

13. The bed finisher of claim 12, wherein each of said left and right upright members comprises a frame member carrying said means for mating with pivot means formed in the side walls of the cargo bed and said means for mating with latch members on the side walls of the cargo bed, and a cover member.

14. The bed finisher of claim 13, wherein said rigid transverse member comprises a frame member and a cover member.

15. The bed finisher of claim 1, further comprising a transverse airfoil member mounted to said left and right upright members.

16. A bed finisher for being received in lieu of a tailgate of a vehicle having a cargo bed, wherein the lateral ends of the tailgate are releasably latchable to vertical side walls of the cargo bed of the vehicle, said bed finisher comprising:

left and right upright members, each including means for mating with members on the side walls of the cargo bed for releasably latching the ends of the tailgate to the side walls of the cargo bed of the vehicle and a cover member concealing said means for mating, a rigid transverse member extending between and affixed to said left and right upright members, and means for mating with pivot members on the cargo bed of the vehicle for pivotally supporting the tailgate of the vehicle, whereby said bed finisher may be supported on the vehicle in the same manner as the tailgate of the vehicle.

17. The bed finisher of claim 16, wherein each of said left and right upright members comprises a frame member carrying catch means for mating with latch members on the side walls of the cargo bed, said cover member substantially concealing said frame member when said bed finisher is in place in the cargo bed of a vehicle.

18. The bed finisher of claim 17, wherein plural differing types of said frame members are designed specifically to fit the cargo beds of one or more differing types of standard vehicles, and said cover members are designed to be affixed in an identical manner to said plural differing types of frame members.

19. The bed finisher of claim 16, wherein said left and right upright members further comprise means for attachment of a flexible net across the cargo bed of said vehicle.

20. The bed finisher of claim 16, wherein said means for mating with pivot members is carried by said rigid transverse member affixed to said left and right upright members.

* * * * *

UNITED STATES PATENT AND TRADEMARK OFFICE
CERTIFICATE OF CORRECTION

PATENT NO. : 5,149,164
DATED : September 22, 1992
INVENTOR(S) : Jesse E. Wilson

It is certified that error appears in the above-identified patent and that said Letters Patent is hereby corrected as shown below:

Column 4, line 67 "3" should be --32--.

Column 4, line 68 "3B" should be --38--.

Signed and Sealed this

Twenty-second Day of February, 1994

Attest:

BRUCE LEHMAN

*Attesting Officer*  *Commissioner of Patents and Trademarks*